United States Patent
Liu et al.

(10) Patent No.: US 10,462,458 B2
(45) Date of Patent: *Oct. 29, 2019

(54) CODEWORD ASSIGNMENT FOR INTRA CHROMA MODE SIGNALLING FOR HEVC

(71) Applicant: SONY CORPORATION, Tokyo (JP)

(72) Inventors: Wei Liu, San Jose, CA (US); Lina Dong, San Jose, CA (US)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/202,686

(22) Filed: Nov. 28, 2018

(65) Prior Publication Data

US 2019/0098300 A1    Mar. 28, 2019

Related U.S. Application Data

(63) Continuation of application No. 15/866,542, filed on Jan. 10, 2018, now Pat. No. 10,250,876, which is a
(Continued)

(51) Int. Cl.
*H04N 19/11* (2014.01)
*H04N 19/50* (2014.01)
(Continued)

(52) U.S. Cl.
CPC .......... *H04N 19/11* (2014.11); *H04N 19/176* (2014.11); *H04N 19/186* (2014.11); *H04N 19/23* (2014.11);
(Continued)

(58) Field of Classification Search
CPC .... H04N 19/186; H04N 19/176; H04N 19/11; H04N 19/593; H04N 19/61;
(Continued)

(56) References Cited

U.S. PATENT DOCUMENTS 8,755,435 B2   6/2014 Guo et al.
8,861,594 B2  10/2014 Kim et al.
(Continued)

FOREIGN PATENT DOCUMENTS

CN   1784015 A   6/2006
CN   1812582 A   8/2006
(Continued)

OTHER PUBLICATIONS

Tabatabai et al. "HM2 Chroma Intra Coding Description," joint Collaborative Team on Video Coding (JCT-VC) of ITU-T SG16 WP3 and ISO/IEC JTC1/SC29/WG11 3rd Meeting: Guangzhou, CN, Oct. 7-15, 2010 Document: JCTVC-E395. (Year: 2010).*
(Continued)

*Primary Examiner* — Nathnael Aynalem
(74) *Attorney, Agent, or Firm* — Chip Law Group

(57) ABSTRACT

Intra prediction is used in state-of-the-art video coding standards such as AVC. The intra prediction modes are coded into the bitstream. Luma and chroma components could potentially have different prediction modes. For chroma components, there are 5 different modes defined in AVC: vertical, horizontal, DC, diagonal down right, and "same as luma". Statistics show that the "same as luma" mode is frequent used, but in AVC, this mode is encoded using more bits than other modes during entropy coding, therefore the coding efficiency is decreased. Accordingly, a modified binarization/codeword assignment for chroma intra mode signaling is able to be utilized for high efficiency video coding (HEVC), the next generation video coding standard.

12 Claims, 3 Drawing Sheets

Related U.S. Application Data continuation of application No. 14/326,334, filed on Jul. 8, 2014, now Pat. No. 9,955,156, which is a continuation of application No. 13/038,157, filed on Mar. 1, 2011, now abandoned.

(60) Provisional application No. 61/432,957, filed on Jan. 14, 2011, provisional application No. 61/432,970, filed on Jan. 14, 2011.

(51) Int. Cl.
| | | |
|---|---|---|
| *H04N 19/176* | (2014.01) | |
| *H04N 19/46* | (2014.01) | |
| *H04N 19/61* | (2014.01) | |
| *H04N 19/593* | (2014.01) | |
| *H04N 19/463* | (2014.01) | |
| *H04N 19/186* | (2014.01) | |
| *H04N 19/23* | (2014.01) | |
| *H04N 19/93* | (2014.01) | |

(52) U.S. Cl.
CPC ........... *H04N 19/46* (2014.11); *H04N 19/463* (2014.11); *H04N 19/50* (2014.11); *H04N 19/593* (2014.11); *H04N 19/61* (2014.11); *H04N 19/93* (2014.11)

(58) Field of Classification Search
CPC .... H04N 19/159; H04N 19/50; H04N 19/103; H04N 19/105; H04N 19/52; H04N 19/13; H04N 19/48; H04N 19/91; H04N 19/69; H04N 19/1887; H04N 19/93; H04N 19/107
USPC ........................................ 375/240.01–240.29
See application file for complete search history.

(56) References Cited

U.S. PATENT DOCUMENTS

| | | | |
|---|---|---|---|
| 2003/0048208 A1* | 3/2003 | Karczewicz | H03M 7/42 341/67 |
| 2006/0056518 A1 | 3/2006 | Conklin | |
| 2007/0025441 A1 | 2/2007 | Ugur et al. | |
| 2008/0260028 A1* | 10/2008 | Lamy-Bergot | H04N 21/23476 375/240.13 |
| 2008/0310507 A1 | 12/2008 | Ye et al. | |
| 2009/0175334 A1 | 7/2009 | Ye et al. | |
| 2012/0177112 A1 | 7/2012 | Guo et al. | |
| 2013/0272401 A1 | 10/2013 | Seregin et al. | |

FOREIGN PATENT DOCUMENTS

| | | |
|---|---|---|
| KR | 10-1872663 B1 | 6/2018 |
| KR | 10-1912567 B1 | 10/2018 |

OTHER PUBLICATIONS

Office Action for KR Patent Application No. 10-2018-0125318, dated Dec. 19, 2018, 06 pages of Office Action and 05 pages of English Translation.

Yu Liu,"Analysis of Coding Tools in HEVC Test Model (HM 1.0)—Intra Prediction", H265.net, Witness the development of H.265, Dec. 1, 2010, http://www.h265.netf201 0/12/analysis-of-coding-tools-in-hevc-test, Apr. 3, 2014.

Chen, et al., "Chroma Intra Prediction by Reconstructed Luma Samples", Joint Collaborative Team on Video Coding (JCT-VC) of ITU-T SG16 WP3 and ISO/IEC JTC1/SC29/WG11, JCTVC-C206, 3rd Meeting: Guangzhou, CN, Oct. 7-15, 2010, 07 pages.

Wiegand, et al., "WD1: Working Draft 1 of High-Efficiency Video Coding", Joint Collaborative Team on Video Coding (JCT-VC) of ITU-T SG16 WP3 and ISO/IEC JTC1/SC29/WG11, JCTVC-C403, 3rd Meeting: Guangzhou, CN, Oct. 7-15, 2010, 137 pages.

Office Action for KR Patent Application No. 2017-0034598, dated Apr. 28, 2017, 04 pages of Office Action and 03 pages of English Translation.

Tabatabai, et al., "HM2 Chroma Intra Coding Description," Joint Collaborative Team on Video Coding (JCT-VC) of ITU-T SG16 WP3 and ISO/IEC JTC1 /SC29/WG11, 3rd Meeting: Guangzhou, CN, Oct. 7-15, 2010, Document: JCTVC-E395, 03 pages.

Office Action received for Korean Patent Application No. 10-2013-0066403, dated May 31, 2016, 07 pages of Office Action and 3 pages of English Translation.

Notice of Allowance for U.S. Appl. No. 14/326,334, dated Dec. 19, 2017, 08 pages.

Advisory Action for U.S. Appl. No. 14/326,334, dated Jun. 22, 2017, 06 pages.

Non-Final Rejection for U.S. Appl. No. 14/326,334, dated Sep. 14, 2017, 10 pages.

Final Rejection for U.S. Appl. No. 14/326,334, dated Mar. 30, 2017, 12 pages.

Non-Final Rejection for U.S. Appl. No. 14/326,334, dated Aug. 19, 2016, 07 pages.

Final Rejection for U.S. Appl. No. 13/038,157, dated Aug. 15, 2014, 09 pages.

Non-Final Rejection for U.S. Appl. No. 13/038,157, dated Apr. 25, 2014, 09 pages.

Final Rejection for U.S. Appl. No. 13/038,157, dated Oct. 24, 2013, 12 pages.

Non-Final Rejection for U.S. Appl. No. 13/038,157, dated Aug. 13, 2013, 12 pages.

Advisory Action for U.S. Appl. No. 13/038,157, dated Dec. 5, 2013, 02 pages.

Notice of Allowance for U.S. Appl. No. 15/866,542, dated Oct. 15, 2018, 08 pages.

Non-Final Rejection for U.S. Appl. No. 15/866,542, dated Jun. 13, 2018, 13 pages.

\* cited by examiner

CODEWORD ASSIGNMENT FOR INTRA CHROMA MODE SIGNALLING FOR HEVC

CROSS-REFERENCE TO RELATED APPLICATION(S)

This application is a continuation of U.S. patent application Ser. No. 15/866,542, filed Jan. 10, 2018, which is a continuation of U.S. patent application Ser. No. 14/326,334, filed Jul. 8, 2014, now U.S. Pat. No. 9,955,156, issued Apr. 24, 2018, which is a continuation of U.S. patent application Ser. No. 13/038,157, filed Mar. 1, 2011 (now abandoned), which claims priority under 35 U.S.C. § 119(e) of the U.S. Patent Application Ser. No. 61/432,970, filed Jan. 14, 2011 and U.S. Patent Application Ser. No. 61/432,957, filed Jan. 14, 2011.

FIELD OF THE INVENTION

The present invention relates to the field of image processing. More specifically, the present invention relates to a modified codeword assignment for intra chroma mode signaling for High Efficiency Video Coding (HEVC).

BACKGROUND OF THE INVENTION

A standard binarization/Variable Length Coding (VLC) codeword assignment scheme used in Advanced Video Coding (AVC) is shown in Table 1. In AVC, the prediction mode for an intra coded block is signaled in the bitstream to the decoder. Possible chroma prediction modes/directions are vertical, horizontal, DC, diagonal and "same as luma." The modes are each assigned a codeword from O through 4 and are signaled using truncated unary code in the bitstream.

TABLE 1

Intra prediction mode for chroma component.

| intra_pred_mode_chroma | Binarization/VLC Codeword |
|---|---|
| 0 (vertical) | 0 |
| 1 (horizontal) | 10 |
| 2 (DC) | 110 |
| 3 (diagonal down right) | 1110 |
| 4 (same as luma) | 1111 |

A statistical study shows that there is a high probability for the chroma components to use the sample prediction direction as the luma component of the block. However, the "same as luma" mode is assigned the longest codeword in Table 1 (4 bits), which is not efficient. On the other hand, redundancy also exists between mode 4 and mode 0-3, when the luma prediction mode is one of vertical, horizontal, DC and diagonal down right. Therefore, a better design of the codeword table is needed.

SUMMARY OF THE INVENTION

Intra prediction is used in state-of-the-art video coding standards such as AVC. The intra prediction modes are coded into the bitstream. Luma and chroma components could potentially have different prediction modes. For chroma components, there are 5 different modes defined in AVC: vertical, horizontal, DC, diagonal down right, and "same as luma." Statistics show that the "same as luma" mode is frequently used, but in AVC, this mode is encoded using more bits than other modes during entropy coding, therefore the coding efficiency is decreased.

Accordingly, a modified binarization/codeword assignment for chroma intra mode signaling is able to be utilized for high efficiency video coding (HEVC), the next generation video coding standard.

In one aspect, a method programmed in a controller of a device comprises programming a codeword assignment and performing intra coding prediction using the codeword assignment. The codeword assignment comprises five modes including vertical, horizontal, DC, diagonal down right and same as luma. A codeword for the same as luma mode includes the fewest bits of the five modes. The method further comprises determining if the mode of the same as luma is the same as one of the other modes, and if the mode of the same as luma is the same as one of the other modes, then reconfiguring the codeword assignment so that the same mode is removed and remaining mode codewords are reduced in bits. The intra coding prediction is used to decode an image. The codeword assignment is programmed in a memory of the device. The codeword assignment includes programming hardware logic. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-Ray® writer/player, a television and a home entertainment system.

In another aspect, an apparatus for implementing a codeword assignment comprises a programming module for programming a codeword assignment wherein the codeword assignment includes a same as luma codeword with a fewest bits of codewords and an intra coding prediction module for performing intra coding prediction using the codeword assignment. The codeword assignment comprises five modes including vertical, horizontal, DC, diagonal down right and the same as luma. The apparatus further comprises a comparison module for determining if a same as luma mode value is equal to another codeword mode value. The apparatus further comprises a reconfiguring module for reconfiguring the codeword assignment, if the luma mode value is equal to another codeword mode value. Reconfiguring the codeword assignment includes removing the same mode and reducing bits in remaining mode codewords. The intra coding prediction is used to decode an image. The codeword assignment is programmed in a memory of the device. The codeword assignment includes programming hardware logic. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, an apparatus comprises a memory for storing an application, the application for programming a codeword assignment including five modes including vertical, horizontal, DC, diagonal down right and same as luma, wherein same as luma includes a fewest bits of the modes and performing intra coding prediction using the codeword assignment and a processing component coupled to the memory, the processing component configured for processing the application. The apparatus further comprises determining if the mode of the same as luma is the same as one of the other modes, and if the mode of the same as luma is the same as one of the other modes, then reconfiguring the codeword assignment so that the same mode is removed and remaining mode codewords are reduced in bits. The intra coding prediction is used to decode an image. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

DETAILED DESCRIPTION OF THE PREFERRED EMBODIMENT

Since the texture pattern of luma and chroma components are correlated, often times the mode used for the luma prediction is also good for the chroma prediction. Thus, the "same as luma" mode is likely to be the best mode. Therefore, a redefined binarization/Variable Length Coding (VLC) scheme is shown in Table 2. As shown, the "same as luma" mode has the shortest codeword (only 1 bit) in the improved scheme.

TABLE 2

Standard Binarization/VLC codeword versus Improved Binarization/VLC codeword.

| intra_pred_mode_chroma | Standard Binarization/VLC Codeword | Improved Binarization/VLC Codeword |
| --- | --- | --- |
| 0 (vertical) | 0 | 10 |
| 1 (horizontal) | 10 | 110 |
| 2 (DC) | 110 | 1110 |
| 3 (diagonal down right) | 1110 | 1111 |
| 4 (same as luma) | 1111 | 0 |

Furthermore, chroma intra modes are not mutually exclusive. For example, if the luma intra mode is vertical, then the "same as luma" is the same as vertical. Therefore, codeword space reduction is able to be used to further improve coding efficiency, such that if the luma mode is one of vertical, horizontal, DC or diagonal down right, the corresponding mode is removed from the chroma mode list, and accordingly, the codeword space of the truncated unary code is reduced from 0 through 4 to 0 through 3. Table 3 shows a complete list of codewords.

TABLE 3

List of codewords using codeword space reduction.

| intra_pred_mode_chroma | intra_pred_mode_luma | | | | |
| --- | --- | --- | --- | --- | --- |
|  | 0 | 1 | 2 | 3 | others |
| 0 (vertical) | n/a | 10 | 10 | 10 | 10 |
| 1 (horizontal) | 10 | n/a | 110 | 110 | 110 |
| 2 (DC) | 110 | 110 | n/a | 111 | 1110 |
| 3 (diagonal down right) | 111 | 111 | 111 | n/a | 1111 |
| 4 (same as luma) | 0 | 0 | 0 | 0 | 0 |

Figure 1:
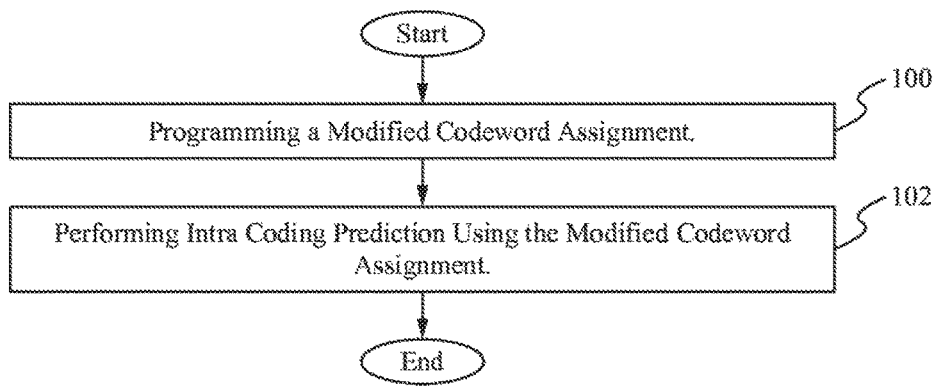
FIG. 1 illustrates a flowchart of a method of intra coding prediction using a modified codeword assignment according to some embodiments.

FIG. 1 illustrates a flowchart of a method of intra coding prediction using a modified codeword assignment according to some embodiments. In the step 100, a modified codeword assignment is programmed. In some embodiments, programming includes storing the assignment in memory. In some embodiments, programming includes designing hardware to implement the assignment. In some embodiments, another method of programming is implemented. Table 3 (above) shows an example of the modified codeword assignment where the "same as luma" codeword uses the fewest bits. In the step 102, the modified codeword assignment is utilized to perform intra coding prediction (e.g. determining a directional prediction mode). In some embodiments, fewer or additional steps are implemented.

Figure 2:
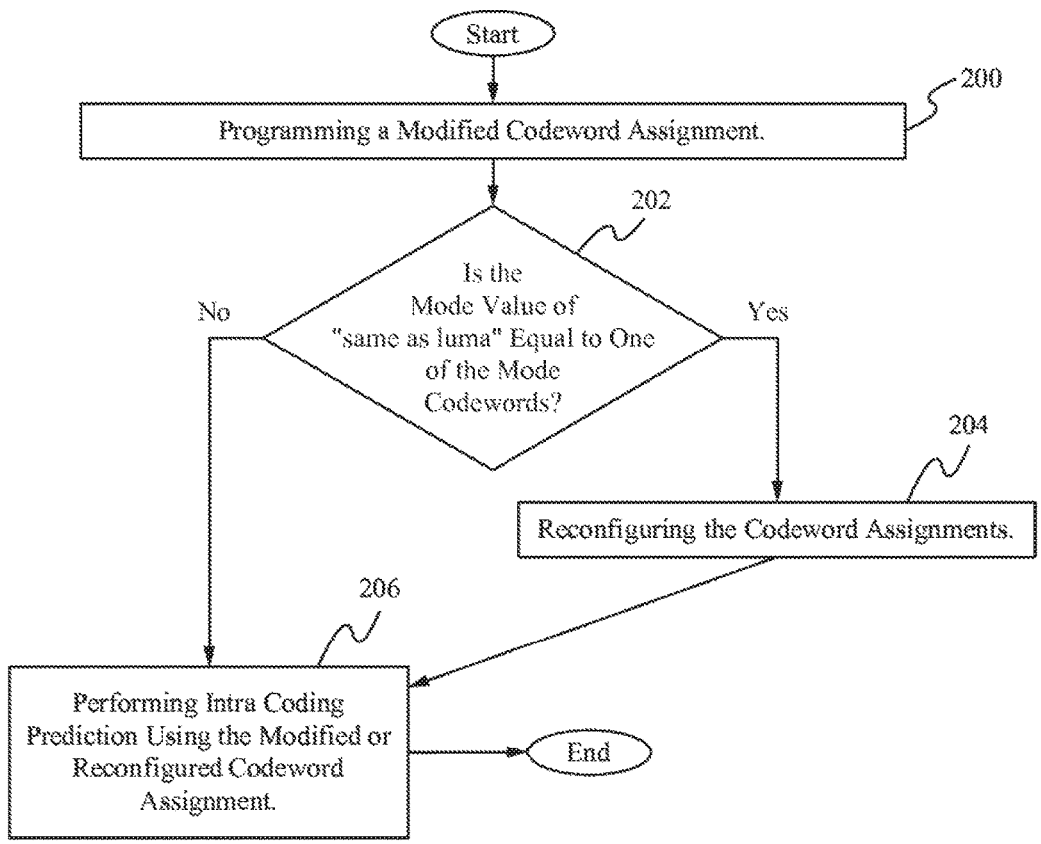
FIG. 2 illustrates a flowchart of a method of modifying a codeword assignment according to some embodiments.

FIG. 2 illustrates a flowchart of a method of modifying a codeword assignment according to some embodiments. In the step 200, a modified codeword assignment is programmed. In some embodiments, programming includes storing the assignment in memory. In some embodiments, programming includes designing hardware to implement the assignment. In some embodiments, another method of programming is implemented. In the step 202, it is determined if the mode value of "same as luma" is the same as one of the mode codewords. If the mode value of "same as luma" is not the same as one of the mode codewords, then the codeword assignment is not modified further, and the process goes to the step 206. If the mode value of "same as luma" is the same as one of the mode codewords, then in the step 204, that mode codeword is removed or not used, and the remaining mode codewords are reconfigured and the codeword assignment is modified again. For example, the codewords are reconfigured as shown in Table 4 above. In the step 206, the modified codeword assignment is utilized to perform intra coding prediction (e.g. determining a directional prediction mode). The steps of modifying the codeword assignment is able to be repeated as needed. In some embodiments, fewer or additional steps are implemented. For example, in some embodiments, the step 200 is skipped or moved.

Figure 3:
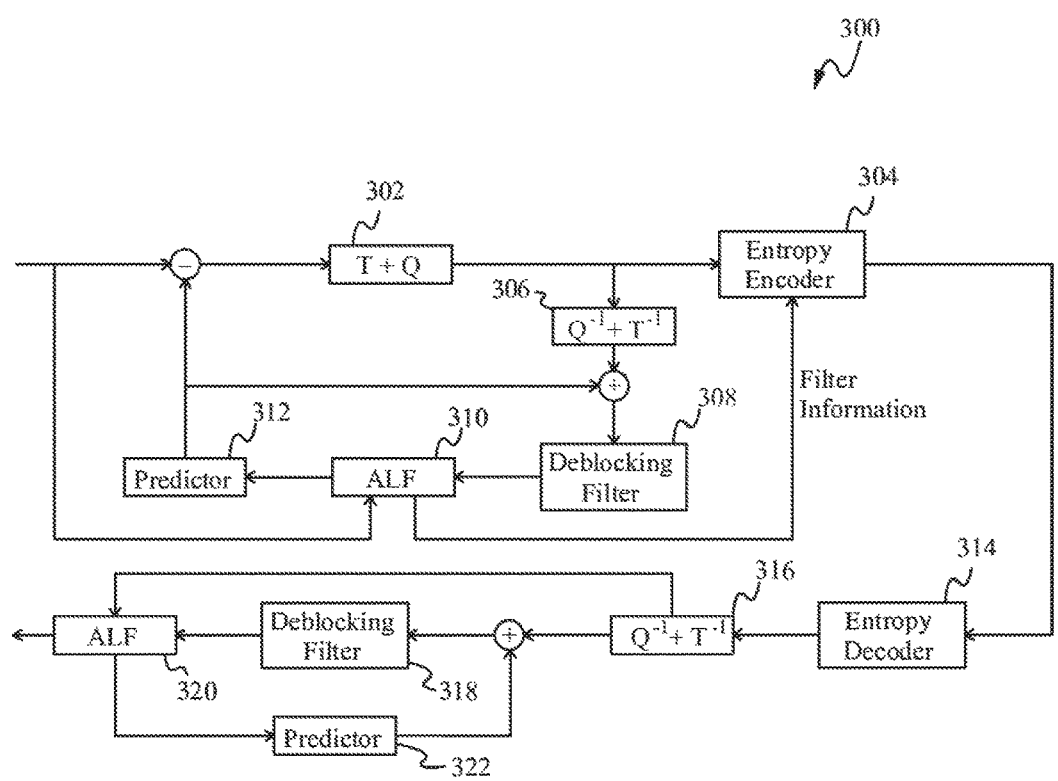
FIG. 3 illustrates a block diagram of a coder/decoder (codec) according to some embodiments.

FIG. 3 illustrates a block diagram of a coder/decoder (codec) according to some embodiments. An input video is received at the codec 300, and the video is split into a plurality of blocks. The codec 300 includes encoder components including: a Transform/Quantization module 302 where transform coefficients are scaled and quantized, an entropy encoder 304 such as a Context Adaptive Binary Arithmetic Coding (CABAC) performs entropy coding, an inverse Transform/Quantization module 306 applies an inverse transform/quantization, a deblocking filter 308 is implemented to control the strength of the filtering to reduce the pixelation of the image, an adaptive loop filter 310 improves coding efficiency by applying filters to the deblocking-filtered image and a predictor 312 performs prediction steps. The codec 300 also includes decoder components including: an entropy decoder 314 for implementing entropy decoding, a second inverse Transform/Quantization module 316, a second deblocking filter 318, a second adaptive loop filter 320 and a second predictor 322, which perform similar operations to those described above except in a decoding implementation. In the predictor 312, the modified codeword assignment is implemented to provide more efficient intra mode prediction. Fewer or additional components are able to be included as well.

Figure 4:
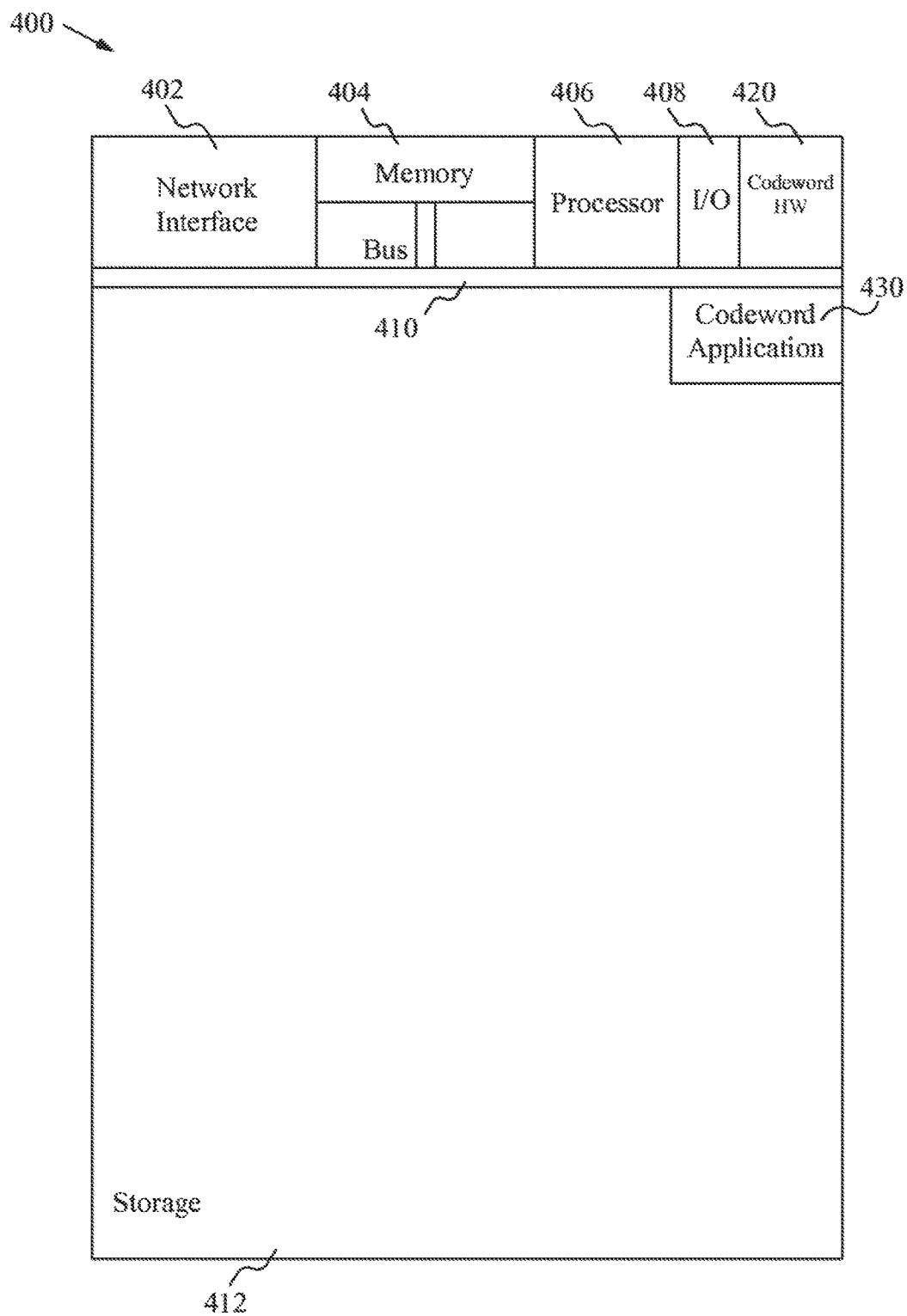
FIG. 4 illustrates a block diagram of an exemplary computing device configured to implement a modified codeword assignment according to some embodiments.

FIG. 4 illustrates a block diagram of an exemplary computing device 400 configured to implement the modified codeword assignment according to some embodiments. The computing device 400 is able to be used to acquire, store, compute, process, communicate and/or display information such as images, videos and audio. For example, a computing device 400 is able to acquire and store an image. The modified codeword assignment is able to be used during or after acquiring the image, or when displaying the image on the device 400. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, button interface and other devices. In some embodiments, the hardware structure includes multiple processors and other hardware to perform parallel processing. Modified codeword assignment application(s) 430 used to implement the modified syntax are likely to be stored in the storage device 412 and memory 404 and processed as applications are typically processed. More or less components shown in FIG. 4 are able to be included in the computing device 400. In some embodiments, modified codeword assignment hardware 420 is included. Although the computing device 400 in FIG. 4 includes applications 430 and hardware 420 for implementing the modified codeword assignment, the modified codeword assignment is able to be implemented on a computing device in hardware, firmware, software or any combination thereof. For example, in some embodiments, the modified codeword assignment applications 430 are programmed in a memory and executed using a processor. In another example, in some embodiments, the modified codeword assignment hardware 420 is programmed hardware logic including gates specifically designed to implement the method.

In some embodiments, the modified codeword assignment application(s) 430 include several applications and/or modules. Modules include a programming module for programming a modified codeword assignment, an intra coding prediction module for performing the intra coding prediction using the modified codeword assignment, a comparison module for determining if the "same as luma" mode value is equal to one of the mode codewords and a reconfiguring module for reconfiguring the codeword assignment. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-Ray® writer/player, a television, a home entertainment system or any other suitable computing device.

To utilize the modified codeword assignment, a user acquires a video/image such as on a digital camcorder, and while or after the video is acquired, or when displaying the video, the modified codeword assignment is utilized in the intra coding prediction aspect of encoding the video. The modified codeword assignment is able to be implemented automatically without user involvement.

In operation, the modified codeword assignment enables more efficient prediction. A simple modified codeword assignment is able to be used where "same as luma" has the shortest codeword, or a slightly more complex codeword assignment is able to be used where the codeword assignment change depending on whether "same as luma" mode is the same as one of the other modes. In some embodiments, the luma prediction is checked at the encoder, the decoder or both.

The invention claimed is:

1. A decoding device, comprising:
   circuitry configured to:
     execute a debinarization process on same-as-luma intra prediction mode for a chroma component based on a codeword assignment, wherein
       in the same-as-luma intra prediction mode for the chroma component, an intra prediction mode for the chroma component is same as an intra prediction mode for a luma component corresponding to the chroma component,
       the intra prediction mode for the chroma component is assigned to one bit in case the intra prediction mode for the chroma component is the same-as-luma intra prediction mode, and
       the one bit of the same-as-luma intra prediction mode for the chroma component is a shortest codeword among a plurality of codewords associated with a plurality of intra prediction modes for the chroma component.

2. The decoding device according to claim 1, wherein the plurality of intra prediction modes for the chroma component includes five intra prediction modes.

3. The decoding device according to claim 2, wherein the five intra prediction modes include at least one of a vertical mode, a horizontal mode, or a DC mode.

4. The decoding device according to claim 1, wherein the codeword assignment for the same-as-luma intra prediction mode is modified based on a mode value of the same-as-luma intra prediction mode.

5. The decoding device according to claim 4, wherein the circuitry is further configured to execute, based on the modified codeword assignment, an intra coding prediction process for the same-as-luma intra prediction mode.

6. The decoding device according to claim 5, wherein the circuitry is further configured to decode a bit stream based on the execution of the intra coding prediction process.

7. A decoding method, comprising:
   executing a debinarization process on a same-as-luma intra prediction mode for a chroma component based on a codeword assignment, wherein in the same-as-luma intra prediction mode for the chroma component, an intra prediction mode for the chroma component is same as an intra prediction mode for a luma component corresponding to the chroma component, the intra prediction mode for the chroma component is assigned to one bit in case the intra prediction mode for the chroma component is the same-as-luma intra prediction mode, and the one bit of the same-as-luma intra prediction mode for the chroma component is a shortest codeword among a plurality of codewords associated with a plurality of intra prediction modes for the chroma component.

8. The decoding method according to claim 7, wherein the plurality of intra prediction modes for the chroma component includes five intra prediction modes.

9. The decoding method according to claim 8, wherein the five intra prediction modes include at least one of a vertical mode, a horizontal mode, or a DC mode.

10. The decoding method according to claim 7, wherein the codeword assignment for the same-as-luma intra prediction mode is modified based on a mode value of the same-as-luma intra prediction mode.

11. The decoding method according to claim 10, further comprising executing, based on the modified codeword assignment, an intra coding prediction process for the same-as-luma intra prediction mode.

12. The decoding method according to claim 11, further comprising decoding an image based on the execution of the intra coding prediction process.

* * * * *